United States Patent

[11] 3,561,681

| [72] | Inventor | Loren E. Tyler |
| | | Wayzata, Minn. |
| [21] | Appl. No. | 825,237 |
| [22] | Filed | May 16, 1969 |
| [45] | Patented | Feb. 9, 1971 |
| [73] | Assignee | Letco, Inc. |
| | | Long Lake, Minn. |
| | | a corporation of Minnesota |

[54] SPREADER APPARATUS WITH AUXILIARY CONVEYOR MEANS
10 Claims, 6 Drawing Figs.

[52] U.S. Cl. .................................................. 239/663,
214/519, 214/83.26; 239/670, 239/672
[51] Int. Cl. .............................................. A01c 15/12,
B60p 1/38, B60p 1/40
[50] Field of Search .......................................... 214/519,
520, 521, 522, 523, 83.32, 83.26; 239/651, 661,
663, 670, 672—68

[56] References Cited
UNITED STATES PATENTS
| 2,772,767 | 12/1956 | Seifert ........................... | 214/83.26X |
| 3,220,740 | 11/1965 | Kavan et al. ................. | 239/675X |

*Primary Examiner*—Albert J. Makay
*Attorneys*—Donald R. Sjostrom and Robert P. White ABSTRACT: A trailer type spreader-hauler for fertilizer or other particulate material and including a hopper or tank for containing the material, a chain conveyor for moving material longitudinally of the hopper, a distributor apparatus at the rear of the hopper for spreading the material, and an auxiliary auger conveyor mounted adjacent the front end of the unit. The auxiliary conveyor includes a lower portion fixed with respect to the hopper and inclined with respect to the horizontal and a movable portion which in one position is in continuous alignment with the fixed portion but is pivotable through a vertical arc to a retracted or rest position wherein it extends back across the front of the hopper so that it does not interfere with normal use of this apparatus as a spreader. Normal drive means for the apparatus when used as a spreader includes a power takeoff driven drive means for operating the distributor apparatus and a ground driven drive means for driving the longitudinal conveyor whereby it conveys material to the rear of the hopper. An auxiliary drive means including power takeoff driven drive means is operable to drive the auxiliary conveyor and to drive the longitudinal conveyor in a reverse direction whereby material is conveyed to the front end thereof and to the auxiliary conveyor.

PATENTED FEB 9 1971
3,561,681
SHEET 1 OF 2
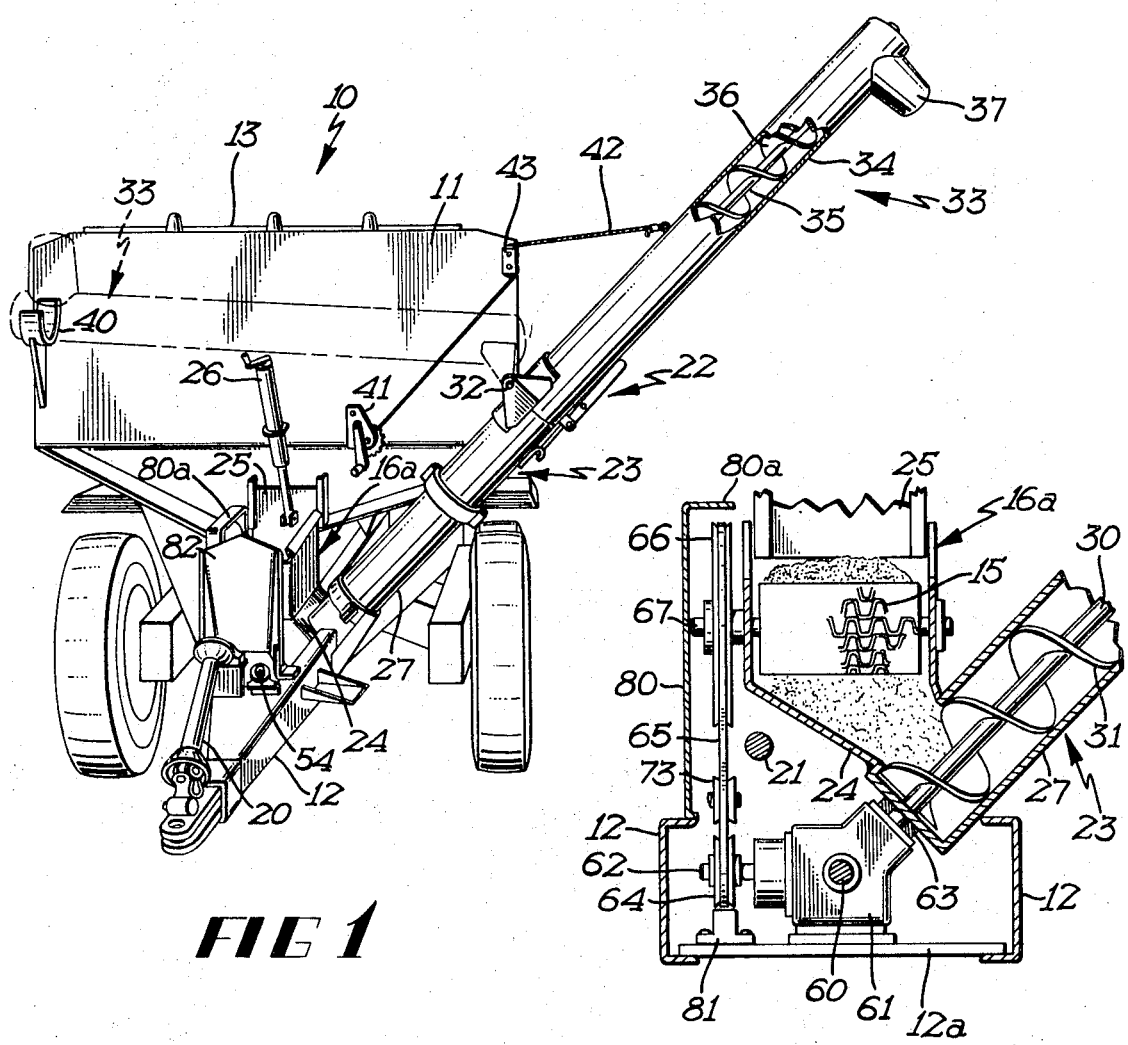
FIG 1
FIG 4
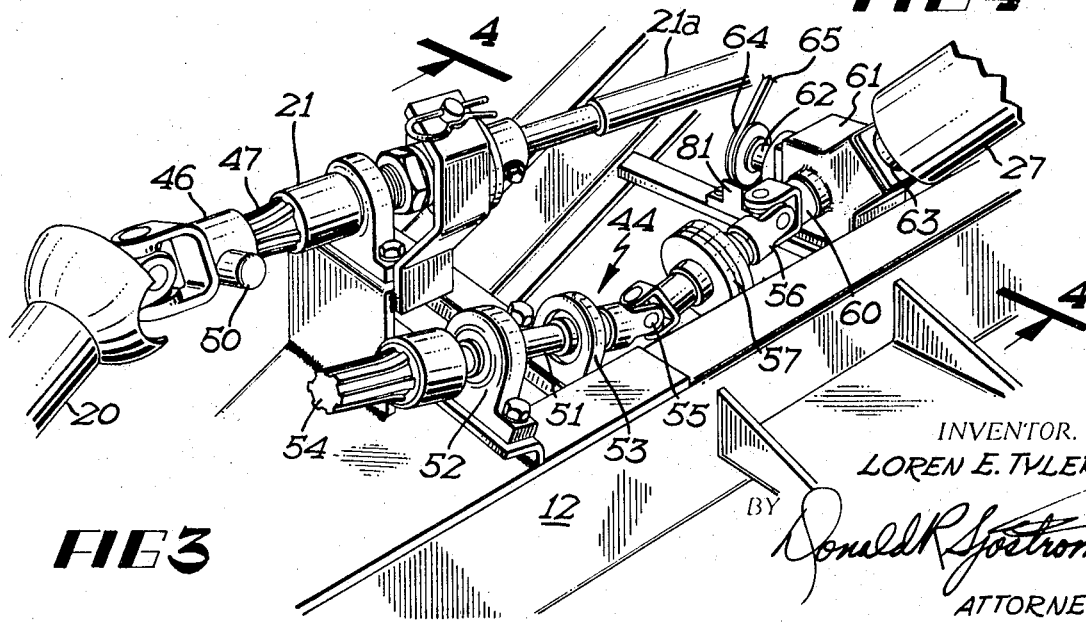
FIG 3
INVENTOR.
LOREN E. TYLER
BY Donald R Sjostrom
ATTORNEY

PATENTED FEB 9 1971

INVENTOR.
LOREN E. TYLER
BY
Donald R. Sjostrom
ATTORNEY

SPREADER APPARATUS WITH AUXILIARY CONVEYOR MEANS

BACKGROUND OF THE INVENTION

This invention relates to auxiliary conveyor or unloader apparatus for use in connection with an agricultural spreader for fertilizer or the like. These spreaders may be of the trailer type or may be mounted on the back of a truck and are generally used to haul the material from the source, such as the fertilizer blending plant, to the farm where the apparatus is then used to spread the material onto the field. It has been recognized that a unit of this type can be made much more versatile if it could be converted so that it can also be used as a so-called "bulk hauler." In order to accomplish this, an auxiliary means for unloading the hopper is provided, normally at the forward end of the hopper so that it does not interfere with the spreading apparatus which is normally at the rear. It is essential, of course, that a relatively efficient auxiliary unloading apparatus or conveyor be provided, that it be relatively simple and compact, that it not interfere with the use of the apparatus as a spreader, and that it require very little time and effort to convert the unit from one use to the other. Various arrangements have been proposed in the past but to this applicant's knowledge, each has had certain drawbacks that has kept them from being completely satisfactory.

BRIEF SUMMARY OF INVENTION

This invention provides, in combination with a spreader of the type described, an improved auxiliary conveyor or unloader apparatus for removing material from the hopper independently of the normal spreading apparatus. It renders the apparatus usable as a bulk hauler whereby it can be used to haul material and to unload it into a storage bin, feed bunk or the like. The apparatus is relatively easily added to a conventional spreader, does not interfere with the operation of the device as a spreader, is simple and relatively inexpensive and allows very quick and easy changeover from one operation to the other.

Specifically, the invention provides, in combination with a spreader as described and having a frame and a hopper thereon, a first longitudinal conveyor, distributor or spreader means at the rear of the hopper and adapted to receive material from the longitudinal conveyor, a first disengageable drive means for driving a longitudinal conveyor to convey material from the front to the rear of the hopper and a second drive means which is connectable to a source or rotary power for driving the distributor or spreader means at the rear of the device. The second or auxiliary conveyor means is mounted forward of the hopper and has a receiving end disposed generally below the forward end of the longitudinal conveyor and disposed for conveying material laterally of the hopper. The forward end of the conveyor extends to a position forward of the front of the hopper to accommodate the auxiliary conveyor. An alternate drive means is adapted to be connected to a source of rotative power and is operable thereby to drive the longitudinal conveyor means in a reverse direction whereby it conveys material forwardly in the hopper for delivery to the auxiliary conveyor means. The alternate drive means also includes means connecting it to the alternate conveyor means for driving it to convey material laterally of the hopper.

In the preferred embodiment, the auxiliary conveyor comprises an auger conveyor which is articulated, having a first portion fixed to the frame with a receiving end disposed to receive material from the longitudinal conveyor and with a hinged pivotal portion which is movable between a position generally in extension of the fixed portion and a rest position wherein it extends back across the forward end of the hopper to a position where it is out of the way when the device is used simply as a spreader. Preferably a clutch means is provided between the auxiliary drive means and the longitudinal conveyor whereby this alternate drive means can be operably disengaged from the longitudinal conveyor when the apparatus is to be used as a spreader but can be operably engaged when the longitudinal conveyor is operated in reverse so that material is conveyed to the auxiliary conveyor.

An object of this invention is to provide, in combination with a bulk spreader apparatus as described, an auxiliary conveyor or unloader apparatus which renders the spreader usable also as a bulk hauler.

Another object of the invention is to provide an auxiliary conveyor or unloader apparatus as aforesaid which is readily adaptable to more or less conventional spreader apparatus and which when added thereto will not interfere with the operation of the apparatus as a normal spreader.

Another object of the invention is to provide an auxiliary conveyor or unloader apparatus as aforesaid which requires a minimum of time and effort to convert from operation as a spreader to operation as a bulk hauler, or vice versa.

These and other objects of the invention will become apparent upon reading the following detailed description of the invention

RELATED PATENT APPLICATION

The copending application of Loren E. Tyler and James I. Richardson, Ser. No. 796,979, filed Feb. 6, 1969 is directed to an overcenter winch apparatus which is used in connection with this auxiliary conveyor apparatus for conveniently moving a hinged portion of the conveyor with respect to a fixed portion thereof.

BRIEF DESCRIPTION OF DRAWING

FIG. 1 is a front view of a hauler-spreader for fertilizer or the like which utilizes the present invention to provide an auxiliary means for unloading a hopper which forms a part of the device.

FIG. 3 is a fragmentary perspective view of a portion of the drive means for the spreader and for the auxiliary conveyor apparatus, as seen from the front left of the apparatus in FIG. 1 with certain portions of the apparatus removed for clarity.

FIG. 4 is a fragmentary cross-sectional view taken generally along line 4—4 in FIG. 3.

DETAILED DESCRIPTION

Figure 2:
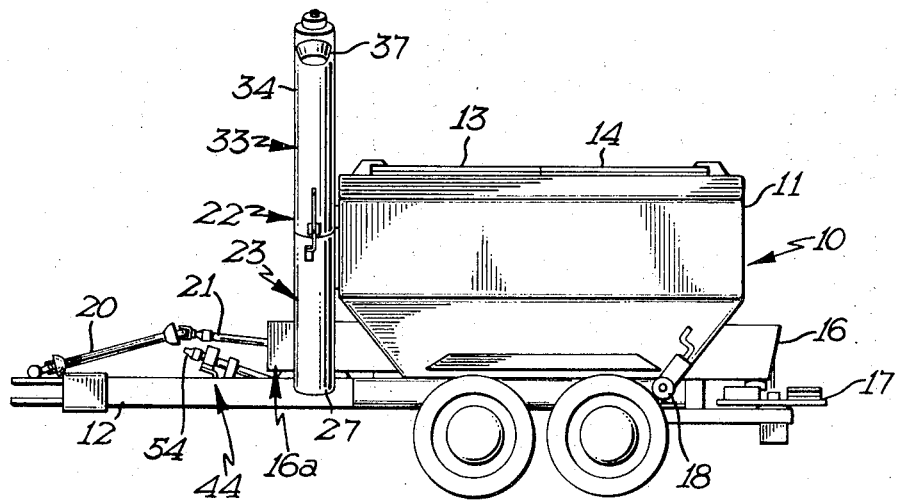
FIG. 2 is a side view, disclosing the hauler-spreader, as seen from the right hand side of FIG. 1.

Referring to the drawing, reference numeral 10 generally designates a fertilizer spreader having a tank or hopper 11 mounted on a frame 12 which is provided with a plurality of wheels and which is adapted to be connected to a truck or tractor for towing. It should be noted that the hopper may also be mounted directly on the bed of a truck. Only a brief description of the details of the spreader per se will be given as is necessary in order to describe the present invention. Hopper 11 provides a large container for particulate material such as fertilizer or feed or the like and may have a capacity, by way of example, in the range from four to eight or ten tons. Preferably hopper 11 has a large opening in the top which may be closed by appropriate means such as a pair of doors 13 and 14 which can be opened to facilitate filling of the hopper and which can be closed to provide a relatively weatherproof cover for it. Generally at the bottom of hopper 11 is a longitudinally extending chain conveyor means 15 which from front to rear of the hopper and which is operable to convey material longitudinally of the hopper. Conveyor means 15 includes means 16 extending rearwardly beyond the end of hopper 11 to a position generally above a distributor means 17 which is used to spread the material at the rear of the spreader. Appropriate drive means 18 such as a retractable drive wheel which is movable to operably engage one of the ground wheels on the spreader, is operable when the spreader is being moved to drive longitudinal conveyor means 15 in a direction to convey material to the rear of the spreader and to deposit it onto distributor means 17. The details of drive means 18 have not been included since they are well known in the art and do not form a part of this invention. It will be appreciated that a ground drive means is generally most satisfactory for this purpose since the speed at which conveyor 15 is driven will then be dependent upon the ground speed of the vehicle. At the forward end of spreader 10 a drive means 21 is adapted to be connected, by means of a flexible power conveying means 20, to a rotative source of power such as the power takeoff of the towing tractor or truck or to an auxiliary power means which may be carried by the towing truck. Drive means 21 includes a rearwardly extending shaft 21a which extends to the rear of the machine and is drivingly connected (by means not shown) to the distributor apparatus 17.

The structure described thus far is a generally conventional bulk fertilizer spreader of the type which is commercially available today from a number of manufacturers including the assignee of the present invention. This invention adds to this relatively conventional spreader an auxiliary conveyor or unloader means 22 which renders the spreader readily usable as a bulk hauler also. Auxiliary conveyor apparatus 22 includes an auger conveyor having a fixed portion 23 mounted on frame 12 and extending from a position generally at the center of hopper 11, forward thereof, and below the forward end of longitudinal conveyor 15, and extending generally outwardly and upwardly to a position substantially at the edge of the hopper (the right hand edge as seen in FIG. 1). As can best be seen in FIGS. 2 and 4, longitudinal conveyor 15 is made to extend forward with a portion 16a extending forward of the hopper for cooperation with the auxiliary conveyor. As can best be seen in FIG. 4, adjacent the forward end of the longitudinal conveyor, portion 16a is formed with a connecting passage portion 24 which conduits material from the forward end of conveyor chain 15 to a lateral opening in the side of fixed auger conveyor 23 substantially at its bottom end. Conveyor 15 extends through an opening (not shown) in the forward end of hopper 11 and a generally vertically movable door 25 is provided to control the rate of removal of material from the hopper by conveyor 15. The position of door 25 may be adjusted by appropriate apparatus such as a hand operated crank apparatus 26.

As indicated, conveyor means 22 is preferably an auger conveyor. Thus, fixed portion 23 includes an auger tube 27 into which connecting chute 24 connects. Inside of tube 27 is auger including a longitudinally extending rotatable shaft 30 with appropriate helical flighting 31 thereon. Connected to the outer end of fixed portion 23, by appropriate hinge means 32 is a movable portion 33 of the auxiliary conveyor. It too includes an auger tube 34 with an auger disposed therein and including a rotatable auger shaft 35 and appropriate helical flighting 36 thereon. Adjacent its remote end portion 33 includes a spout 37 which is effective to direct material laterally from the conveyor. Hinge means 32 provides a horizontal pivot about which movable portion 33 may be pivoted. FIG. 1 discloses in solid lines the extended position of portion 33. As shown there, this portion is in substantially continuous extension of fixed portion 23 and auger shafts 30 and 35 are connected by appropriate means (not shown) so that they rotate together to provide a continuous conveyor for moving material laterally and upwardly from the forward end of longitudinal conveyor means 15. Portion 33 is movable, about hinge means 32, through a vertical arc immediately forward of the front of hopper 11 to a rest position shown in dashed lines in FIG. 1 wherein it extends back across the front of hopper 11 and forms an acute angle with fixed portion 23. In this position, the remote end of portion 33 may rest in a cradle 40 which is mounted on the forward end of hopper 11. In order to conveniently move portion 33 from one of these positions to the other, which movement will include movement through an overcenter position, an overcenter winch arrangement as disclosed in FIG. 1 may be used. This apparatus includes a hand cranked winch 41, a cable 42 and appropriate intermediate pulleys 43 to provide an overcenter winch action. The details of this overcenter winch structure are set forth in the beforementioned pending application Ser. No. 796,979 which was filed on Feb. 6, 1969.

Auxiliary drive means is provided for driving auger conveyor 22 and for simultaneously driving longitudinal conveyor 15 in a reverse direction to convey material forwardly of hopper 11 and to the auxiliary conveyor. As can be seen best in FIG. 3, additional power input means 44 is provided at the forward end of the spreader for this purpose. As indicated, drive means 21 is normally connected to a power takeoff or other source of power by means of flexible power conveying means 20 which includes appropriate universal joints and a connector 46 which slides over a longitudinally splined member 47 at the forward end of means 21. An appropriate locking means 50 is provided to secure members 46 and 47 together.

Auxiliary drive means 44 includes a shaft 51 rotatably mounted in appropriate bearings 52 and 53, which are in turn mounted on frame 12, and has its forward end a splined portion 54 which also is cooperable with end connector 46 on power conveying means 20. Drive means 44 also includes appropriate universal joints 55 and 56 and a slip clutch 57 and terminates with an input shaft 60 extending longitudinally into a gear box 61, providing the input into this gear box. Gear box 61 also includes a first output shaft 62 extending laterally therefrom generally normal to input shaft 60 and extending to the right, as seen in FIGS. 3 and 4. A second output shaft 63 extends laterally and upwardly to the right (as seen in FIGS. 3 and 4) generally in alignment with shaft 30 of fixed portion 23 of the auxiliary conveyor. Output shaft 63 and shaft 30 are operably connected by appropriate means (not shown) so that the auger is driven by this output shaft. As seen in FIG. 4, gear box 61 may be mounted on an appropriate member 12a which extends between two forwardly extending members of frame 12.

Figure 5:
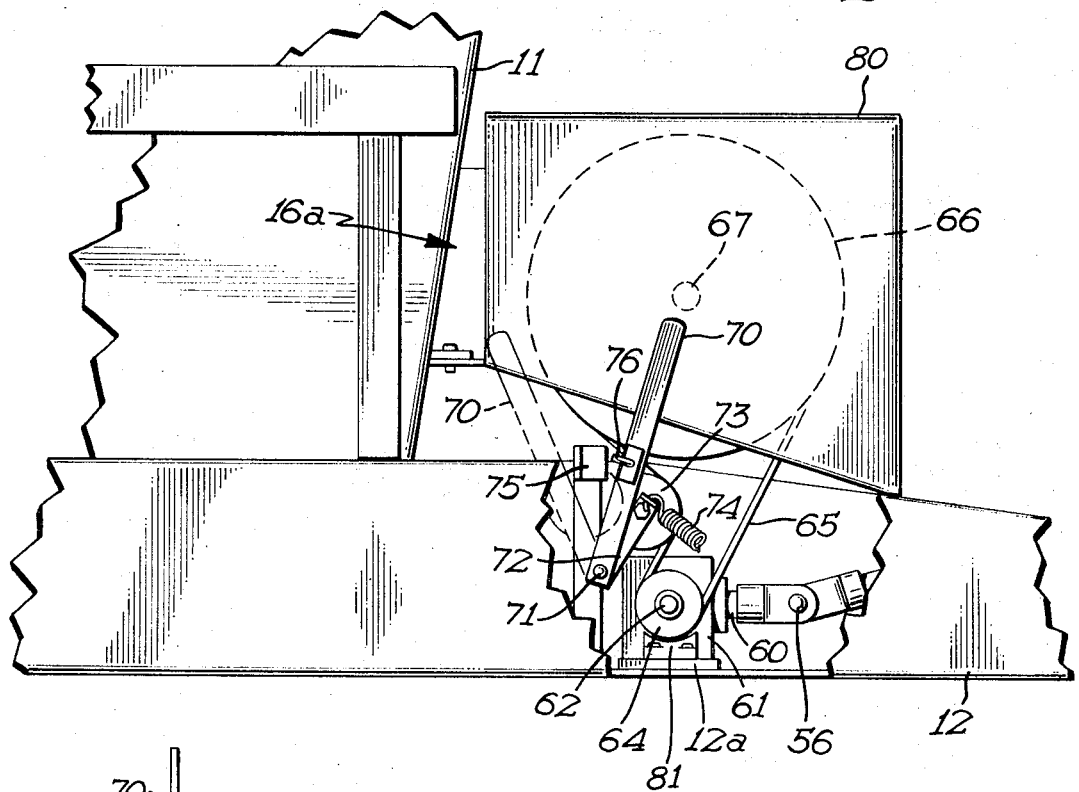
FIG. 5 is an enlarged fragmentary view of a drive means for the auxiliary conveyor as seen from the left hand side of FIG. 1, with portions broken away for clarity.

Output shaft 62 has mounted thereon a pulley 64 which is connected by a belt 65 to a pulley 66 which is connected to a shaft 67 on which the end sprocket (not shown) of chain conveyor 15 is mounted at the forward end of the machine. A clutch arrangement is provided by means of a lever 70 pivoted on frame 12 about a pivot 71 and which has an extending portion 72 carrying an idler pulley 73 lying in a plane with pulleys 64 and 66. A spring 74 has one end connected to portion 72 and another (not shown) connected to frame 12 maintaining spring 71 in tension and urging lever 70 in a clockwise direction to a position wherein idler 73 engages belt 65 and tightens it so that a driving relationship is maintained between pulleys 64 and 66. This is the situation when the clutch apparatus occupies the position disclosed in solid lines in FIG. 5.

Figure 6:
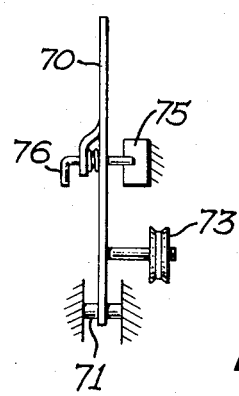
FIG. 6 is a schematic view of a clutch apparatus which forms a part of the drive means for the auxiliary conveyor.

A laterally extending fixed latch stop 75 is mounted on frame 12 in a position to cooperate with a spring biased cooperating latch pin 76 carried by lever 70. When lever 70 is moved to the position disclosed in dashed lines in FIG. 5, latching pin 76 snaps behind latching stop 75 to maintain lever 70 in this position wherein idler 73 is moved sufficiently from belt 65 so that the belt is loose and pulleys 64 and 66 are operably disconnected. The operation of latching members 75 and 76 can be seen better in FIG. 6 which is a schematic view of this portion of the apparatus.

When the device is to be used solely as a spreader, movable portion 33 of the auxiliary conveyor is moved to the rest position as shown in dashed lines in FIG. 1. Clutch lever 70 is moved to the position disclosed in dashed lines in FIG. 5 wherein pulleys 64 and 66 are operably disengaged. Power is applied to drive means 21 which in turn drives distributor 17 and ground drive means 18 is engaged to drive longitudinal conveyor 15 in the direction to convey material to the rear of the hopper.

When the device is used as a bulk hauler, and it is desired to unload it, movable portion 33 of auxiliary conveyor 22 is moved to the extended position. This is accomplished by use of winch 41 and the accompanying overcenter apparatus. Ground drive means 18 is disengaged and power conveying means 20 is removed from drive means 21 and connected to auxiliary drive means 44 through the mating splined portions 46 and 54 and are locked together by means 50. Clutch lever 70 is moved to its forward position wherein belt 65 is tightened so that a driving connection is established between pulleys 64 and 66. The application of rotative power to auxiliary drive means 44 now results in rotation of the auger in auxiliary conveyor means 22 and also in driving of longitudinal conveyor 15 in a direction whereby it conveys material to the forward end of the hopper and into the lower end of auxiliary conveyor 22. The rate of feed of material to conveyor 22 is selected by operating crank apparatus 26 to select the position of door 25.

When clutch lever 70 is moved to the deenergized position, belt 65 hangs relatively loosely around the pulleys. In order to assure that the belt will not fall off from the pulleys, a guard 80 is removably attached in a position along the left hand side of pulley 66 (as seen in FIG. 1) and this not only acts as a safety shield to prevent accidentally becoming entangled in the pulleys but also has an inwardly extending lip 80a extending over the top of and very closely spaced from the top of pulley 66 to preclude the belt from falling off. Beneath pulley 64 a small belt guide 81 may also be secured to member 12a in a position so that it precludes the belt from falling off of this pulley. It will be appreciated that appropriate shielding such as a shield 82 may be mounted above the drive means 21 and 44. This shield is seen in FIG. 1 but has been removed in the remainder of the FIGS. for the sake of clarity.

As described, this invention provides an auxiliary conveyor or unloader apparatus used in combination with a bulk spreader to render the device more versatile so that it can be used either as a spreader or as a bulk hauler. The additional apparatus does not interfere with the function of the device as a spreader and when it is desired to use it as a hauler, the auxiliary conveyor or unloader apparatus can be very quickly placed into operation with a minimum amount of effort. The apparatus is relatively simple and is readily added to the conventional spreader without substantial modification thereof. It will be appreciated that various modifications of this structure may become apparent to those skilled in the art in view of the disclosure herein and that the embodiment disclosed herein is disclosed by way of example only.

I claim:

1. In combination with a spreader for fertilizer or the like having a frame and a hopper thereon, first conveyor means for moving material longitudinally of the hopper and toward the rear end thereof, spreader means disposed at the rear of the hopper and adapted to receive material from the conveyor means, first disengageable drive means for driving the conveyor means to convey material from front to rear of the hopper, and second drive means connectable to a source of rotary power for driving the spreader means, the improvement comprising: second conveyor means mounted forward of the hopper and having a receiving end disposed generally below said first conveyor means and disposed for conveying material laterally of the hopper; said first conveyor means extending forward of the hopper to a position substantially above the receiving end of said second conveyor means; alternate drive means adapted to be connected to a source of rotative power and operable thereby to drive said first conveyor means in a reverse direction whereby it will convey material forwardly in the hopper for delivery to said second conveyor means; and means connecting said alternate drive means to said second conveyor means for driving it to convey material laterally of the hopper.

2. The combination of claim 1 wherein said second conveyor means is an auger conveyor having a fixed portion mounted on said frame with a receiving end disposed in a position substantially at the transverse center of the hopper and below the forward end of the first conveyor means and extending upwardly and laterally so as to form an acute angle with the horizontal.

3. The combination of claim 2 wherein said auger conveyor includes a fixed portion mounted as aforesaid and extending substantially to the edge of the hopper, and includes a hinged portion movable through a vertical arc between an extended position in substantially continuous alignment with said fixed portion and a rest position wherein said movable portion extends back substantially across the front of the hopper and above the fixed portion of said auger conveyor.

4. The combination of claim 1 wherein said alternate drive means includes gear box means having an input shaft, a first output shaft operably connected to said second conveyor means and a second output shaft carrying a drive pulley; a driven pulley operably connected to said first conveyor means forward of said hopper; means drivingly connecting said driving pulley and said driven pulley; and said gear box including gear means interconnecting said input shaft and said output shaft and arranged so that upon application of rotative power to said input shaft said first conveyor means is driven in a reverse direction to deliver material to the forward end of the hopper.

5. The combination of claim 4 wherein said driven pulley is continuously connected with said first conveyor means and rotates upon movement of said conveyor means; and the means interconnecting said driven pulley and said driving pulley includes clutch means operable between engaged and disengaged conditions whereby said driven pulley may be selectively operably disengaged from said driving pulley when the first drive means is operated to drive said first conveyor means in a direction to convey material from the front to rear of the hopper.

6. The combination of claim 1 wherein said second conveyor means includes a fixed portion mounted on said frame forward of the hopper and has a receiving end disposed in a position substantially at the transverse center of the hopper and below the forward end of the first conveyor means, said fixed portion extending upwardly and laterally therefrom to form an acute angle with the horizontal and extending to a position substantially in alignment with one edge of the hopper; and said second conveyor means further includes a movable portion pivotally mounted for movement between an extended position in substantially continuous alignment with said fixed portion and a rest position wherein said movable portion extends back substantially across the front of the hopper and above said fixed portion.

7. A combination hauler and spreader apparatus for fertilizer or the like comprising: frame means; a material storage hopper means mounted on said frame means; spreader apparatus on said frame means at the rear of said hopper; reversible conveyor means extending longitudinally of said hopper means, generally at the bottom thereof and operable to convey material longitudinally with respect to said hopper means; first drive means operable to drive said longitudinal conveyor means in a direction to convey material from front to rear of said hopper means to said spreader apparatus; lateral conveyor means mounted on said frame means forward of said hopper means and having a receiving portion disposed in a position to receive material from said longitudinal conveyor means upon operation thereof in a direction to convey material from rear to front of said hopper means; alternate drive means including input means adapted to be connected to a source of rotative power and including first output means drivingly connected to said lateral conveyor means and second output means including selectively operable clutch means operably connected to said longitudinal conveyor means whereby application of rotative power to said alternate drive means effects driving of said longitudinal conveyor means in said direction whereby it conveys material from rear to front of said hopper.

8. The hauler-spreader apparatus in claim 7 wherein said lateral conveyor means is a segmented conveyor having a first portion mounted on said frame means and fixed with respect thereto and extending laterally and upwardly from a position generally at the transverse center of said hopper and extending substantially to one side thereof; and a second portion movable through a vertical arc with respect thereto between a first position in generally continuous extension of said fixed portion and a second position wherein said second portion extends back across the front of said hopper means substantially from said one side thereof to the other.

9. The apparatus in claim 8 including winch means mounted on said hopper means and including a cable and overcenter pulley means for moving said second portion of said lateral conveyor means between its first and second positions.

10. The apparatus of claim 8 wherein said alternate drive means includes a gear box mounted on said frame means and having an input shaft extending forwardly and adapted for connection to said input shaft and extending laterally and upwardly, thereby forming an acute angle with the horizontal, for direct connection to said lateral conveyor means, and a second output shaft drivingly connected to said input shaft and extending outwardly from said gear box in a transverse direction on the opposite side thereof from said first output shaft, and belt and pulley means, including clutch means, operably connecting said second output shaft and said longitudinal conveyor means.